US009081939B2

(12) United States Patent
Snodgrass

(10) Patent No.: US 9,081,939 B2
(45) Date of Patent: Jul. 14, 2015

(54) METHODS AND SYSTEMS FOR PROVIDING CONTENT WORKFLOW

(71) Applicant: Thomson Licensing, Issy de Moulineaux (FR)

(72) Inventor: Nicholas Edward Snodgrass, Los Angeles, CA (US)

(73) Assignee: Thomson Licensing, Issy-les moulineaux (FR)

( * ) Notice: Subject to any disclaimer, the term of this patent is extended or adjusted under 35 U.S.C. 154(b) by 65 days.

(21) Appl. No.: 13/733,913

(22) Filed: Jan. 4, 2013

(65) Prior Publication Data

US 2014/0020048 A1   Jan. 16, 2014

Related U.S. Application Data

(60) Provisional application No. 61/584,127, filed on Jan. 6, 2012.

(51) Int. Cl.
*G06F 21/00* (2013.01)
*G06F 21/10* (2013.01)

(52) U.S. Cl.
CPC ...................................... *G06F 21/10* (2013.01)

(58) Field of Classification Search
CPC ....... G06F 21/10; G06F 21/105; G06F 21/16; G06F 21/62; G06F 21/6209
USPC .......................................... 726/26, 29, 30, 31
See application file for complete search history.

(56) References Cited

U.S. PATENT DOCUMENTS

2003/0079042 A1* 4/2003 Yamanaka et al. ............ 709/247
2011/0296536 A1* 12/2011 Muller et al. ................... 726/30

\* cited by examiner

*Primary Examiner* — Edward Zee
(74) *Attorney, Agent, or Firm* — Robert D. Shedd; Jerome G. Schaefer

(57) ABSTRACT

Methods and systems for providing a content workflow include, for example, various embodiments for ascribing metadata and processing media assets such as video, audio, and the like for ingestion into a media delivery platform. The content workflow can be implemented in a client/server environment where media assets can be ingested and processed electronically. According to an exemplary embodiment, a method for operating a system includes receiving, via the system, a metadata file for at least one of audio and video content represented by a title, the metadata file including a provider identification; and generating, via the system and in response to the provider identification, one or more software elements representing one or more rules for distributing the content.

12 Claims, 3 Drawing Sheets

METHODS AND SYSTEMS FOR PROVIDING CONTENT WORKFLOW

CROSS REFERENCE TO RELATED APPLICATION

This application claims priority to and all benefits accruing from a provisional application filed in the United States Patent and Trademark Office on Jan. 6, 2012, and there assigned Ser. No. 61/584,127.

BACKGROUND OF THE INVENTION

1. Field of the Invention

The present invention generally relates to various methods and systems for providing a content workflow for media assets (e.g., video, audio and the like) including the ingestion of such media assets into a media delivery platform. The content workflow may be implemented in a client/server environment or a peer-to-peer environment where such media assets can be ingested and processed electronically.

2. Background Information

The process of creating and producing professional quality media assets, such as audio and/or video content, and distributing such content to consumers involves a number of different steps and/or entities, and is evolving. In such a process, content is processed in a workflow that may include various functions, such as encoding, transcoding, quality control, encryption and delivery.

At present, it is believed that such a workflow can be made easier and more efficient for each of the entities involved. Accordingly, there is a need in the art to provide improved methods and systems for providing a content workflow for media assets, such as audio and/or video content. The present invention described herein addresses these and/or other issues.

BRIEF SUMMARY OF THE INVENTION

In accordance with an aspect of the present invention, a method for operating a system is disclosed. According to an exemplary embodiment, the method comprises receiving, via the system, a metadata file for at least one of audio and video content represented by a title, the metadata file including provider identification; and generating, via the system and in response to the provider identification, one or more software elements representing one or more rules for distributing the content.

In accordance with another aspect of the present invention, a system is disclosed. According to an exemplary embodiment, the system comprises means, such as an input, for receiving a metadata file for at least one of audio and video content represented by a title, the metadata file including a provider identification; and means, such as a processor, for generating, in response to the provider identification, one or more software elements representing one or more rules for distributing the content.

The aforementioned brief summary of exemplary embodiments of the present invention is merely illustrative of the inventive concepts presented herein, and is not intended to limit the scope of the present invention in any manner.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
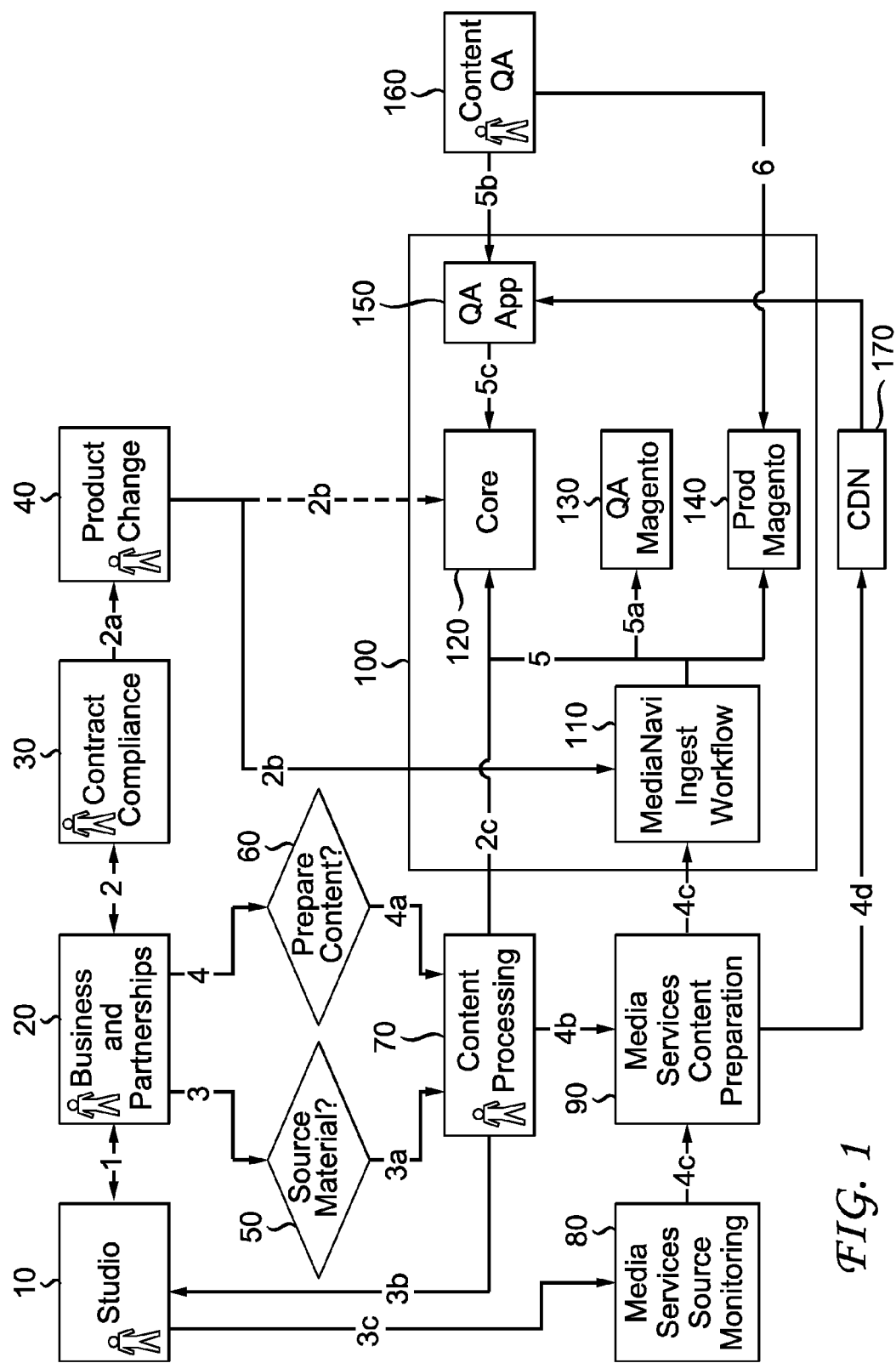
FIG. 1 shows a high level block diagram of a system for providing a content workflow according to exemplary embodiments of the present invention.

The exemplifications set out herein illustrate preferred embodiments of the invention, and such exemplifications are not to be construed as limiting the scope of the invention in any manner.

DETAILED DESCRIPTION OF THE PREFERRED EMBODIMENTS

It is to be understood that the present invention may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

To enhance understanding of the inventive principles disclosed herein, the following terms and definitions, which may be referred to herein, are provided.

AES-128—An encryption standard that is the base of all DRM technologies. AES-128 can be used as a DRM but requires customization and proprietary development.

Content Preparation—The process of encoding from source, creating lesser bit-rate transcodes, wrapping the transcoded outputs in their deliverable format DRM—Digital Rights Management is a technology that protects content from being pirated through a system of encryption and secured license keys that allow client media players to playback content.

Entitlement—A digital usage right that is granted after a sale is made for the right to view a particular piece of content.

These are stored in the Digital Locker and have distribution restrictions associated to said entitlement depending on content provider and entitlement type (VOD, EST, etc.).

EST—Electronic Sell Through is a content distribution model where consumers purchase the rights to content permanently (similar to purchasing a DVD).

Extra Content—Extra assets that are delivered with the Source Material that may include bonus features and applications.

F4F—File format for Adobe's on-demand HTTP dynamic streaming components; its specification describes how content is divided into segments and fragments, where each fragment has bootstrap information to provide cache management Flash Access—An Adobe owned Digital Rights Management Technology HLS—HTTP Live Streaming (also known as HLS) is an HTTP-based media streaming communications protocol implemented by Apple Inc. as part of their QuickTime X and iPhone software systems.

MAL—Material Access Letter, outlines all of the titles to which Content platform is granted access in order to procure and deliver assets ("material")

MediAffinity—A proprietary platform developed by Technicolor that automates highly complex content preparation workflows that include: encoding, transcoding, automated QC, encrypting and delivery.

Mezzanine—A "mastered" high resolution, high bit-rate video file that is used to create smaller, consumer ready video files.

OTT—Over-the-top, VOD services from an alternative provider, such as YouTube

PlayReady—A Microsoft owned Digital Rights Management technology

QA/QC—Quality Assurance/Quality Control is a process that is completed through either automated testing or manual testing that validates the quality of an output file VOD—Video On Demand is a content distribution model where consumers purchase content for a period of time (generally 24 to 48 hours). VOD can also be generically used to describe a service that delivers videos to consumers.

SIFT—A MediAffinity workflow that ingests content Source Material. This process pre-qualifies the material to ensure it complies with requirements, normalizes the audio if out of parameter, and masters the file into a digital Mezzanine format.

Smooth Streaming—Microsoft's IIS Media Services extension that enables adaptive bit rate streaming of media to Silverlight and other clients over HTTP Source Material—Raw un-mastered digital or tape assets that are generally a very high bit-rate. These assets are strictly used business-to-business (B2B) and require post-production work and processing to make suitable for consumer use.

Widevine—A Google owned Digital Rights Management technology.

Referring now to the drawings, and more particularly to FIG. 1, a high level block diagram of a system for providing a content workflow according to exemplary embodiments of the present invention is shown. The exemplary system of FIG. 1 may be implemented in a client/server environment, and comprises a plurality of blocks including studio partner block 10, business and partnerships block 20, contract compliance block 30, product change block 40, decision blocks 50 and 60, content processing block 70, media services source mastering block 80, media services content preparation block 90, content workflow management block 100, content quality assurance (QA) block 160 and content distribution network (CDN) block 170. Content workflow management block 100 comprises ingest workflow block 110, core block 120, QA magento block 130, product magento block 140 and QA application block 150.

For purposes of example and explanation, the following description of exemplary embodiments of the present invention may be described with specific reference to the aforementioned blocks of FIG. 1.

Workflow Description

According to the exemplary embodiments described herein, content workflow refers to the process where one or more distribution agreements are made with one or more studio partners (e.g., block 10) to source, prepare and distribute content through a content delivery system. The content delivery system of the present invention adheres to the rules and restrictions of a pre-negotiated distribution agreement through a system of rules, offers and DRM profiles.

Also according to exemplary embodiments, a given studio partner may be new to the content platform and delivery system of the present invention, and will require on-boarding with a content processing team. Functional steps and/or interactions between the blocks in FIG. 1 will be described with specific reference to items 1-6 and their respective sub-parts, as shown in FIG. 1 and discussed below.

1. Initial Business Negotiations:

The content platform business negotiates a license agreement with studio partner 10 to distribute content either through EST, VOD or Subscription Video-on-Demand (SVOD) models. The business negotiates restrictions and other binding agreement criteria that drive business rules in the content platform system which impacts later steps in the workflow.

2. Product Changes:

At some point in the negotiations prior to the license agreement being signed the agreement is reviewed by a group made up of product, architecture and legal functions to determine if the content platform system can support the restrictions. If some restrictions are not technologically feasible then the compliance team will push back on the requirements. Otherwise:

a. New rule creation to adhere to distribution restrictions and other binding terms in the agreement are routed through the product change team where the work is defined, scoped and scheduled.

b. After the work is scheduled, engineering implements new rules in the content platform workflow and device/asset modules.

c. For existing rules in the device/asset module, the content processing team provides updates.

3. Content Sourcing:

At the point that content platform business has a term sheet from the studio partner 10 and a decision meeting is scheduled to determine if it is appropriate to start sourcing based on the level of confidence that the deal will be signed (i.e., block 50).

a. If it is decided to move forward, a MAL is requested from the studio partner 10 through the content processing team. Business and partnerships block 20 coordinates for an operational contact at the studio for content processing. Additionally, content processing forecasts delivery with the media services team.

b. Studio partner 10 begins to source material.

c. Media services block 80 starts ingesting and mastering source content.

4. Content Order Processing:

Content platform business will kick off another meeting to determine if it is appropriate to start preparing content in the end formats that will be delivered to consumers. According to an exemplary embodiment, this decision (i.e., block 60) is based on the status of the "Long Form" negotiations, and if the team is highly confident the deal will be signed.

a. If the decision is made to prepare content and the content processing begins forecasting the priority of titles required out of MediAffinity from Technicolor (i.e., block 90) by developing a list with Provider ID, Technicolor IDs, MediAffinity barcodes and Title. If the decision is made not to proceed, then processing stops.

b. The request is submitted to MediAffinity.

c. Mastered mezzanines are de-archived from cold storage and MediAffinity begins processing.

d. MediAffinity outputs video files and deploys them via the Aspera connection to content platform's CDN partner.

e. MediAffinity delivers a metadata file into the appropriate providers folder that includes title, Technicolor ID, MediAffinity barcode, video definition, DRM, etc. This will help tell the workflow module how to ingest the metadata into the device/asset module as well as magento.

5. Ingest and QA:

As metadata files are delivered from MediAffinity into the appropriate provider folder the content platform ingest workflow module begins processing and applying rules to each title (representing content) that is ingested into the system. The workflow updates the core with all the locations of the video files on the CDN as well as generates the appropriate policies.

a. The ingest workflow module starts creating nearly identical offers based on the rules into both the production and QA magento. The only difference is that in the QA magento instance the offers will automatically be active for QA. The production magento offers will require a content processing person to update the offer to active.

b. Now that the content has been almost fully ingested into the system the content QA team will use a special version on the content platform application to check playback of the video assets on the CDN.

c. Through QA application the team selects a title, purchases, and plays. This kicks off a call to requested a URL from the device/asset module for playback from the CDN.

d. After the URL is retrieved, the QA version of the application makes the request through CDN 170 and the video file starts playing back after the entitlement is checked and DRM license key is served through the content platform backend.

6. Publish:

Now that the title has been fully ingested and quality checked through the content platform system, a content processing individual updates the production magento instance to publish every offer for that title (representing content).

Detailed Content Flow

According to exemplary embodiments, the content processing team includes a tool that will help source raw material as well as place orders in MediAffinity to process content. This order processing will be a data service driven where with a few key metadata elements MediAffinity will create the appropriate files based on a predefined workflow. The following section will describe this process starting from receiving the confirmation from the business and partnerships team of the business and partnerships module to start sourcing material to final delivery of the video assets to the CDN and metadata to the content platform content workflow module.

Content Sourcing

Sourcing begins once content platform business team of the business and partnerships module approves via item 3 from above. The following will occur:

1. The content processing team will coordinate with studio material procurement (generally an operations function) to coordinate a digital transfer mechanism with a media service team. Additionally, the content processing team communicates the content source preference sheet.

2. Once the digital transfer mechanism is established, the content processing team will prioritize with the studio which titles (representing content) should be delivered first and forecast the delivery to the media service team. The priority will be communicated to the media service team with the following:
  Title
  Technicolor ID (content ID)
  Provider ID (studio)
  Sub-Provider ID (sub-studio)
  Standard Definition (SD) Source Flag—this flag indicates to the Media Service team that they should expect a SD source delivered from the Studio
  High Definition (HD) Source Flag—this flag indicates to the Media Service team that they should expect a HD source delivered from the Studio.

These items will be pulled from the content platform catalogue. Additionally, the team will ensure that there are not multiple Technicolor IDs to the one single title (representing content).

3. As source material is delivered to MediAffinity, it will be processed by the priority set by the content processing team. Once the material is ingested, MediAffinity delivers a metadata file containing the following elements:
  Title
  Technicolor ID (content ID)
  Provider ID (studio)
  Sub-Provider ID (sub-studio)
  MediAffinity Barcode
  SD Source Confirmation Flag
  HD Source Confirmation Flag
  Flags for extra material included with source:
    Extract Content
    Closed Captioning
    Subtitles Content Ordering Process At this point source material is being delivered into MediAffinity and is continuously ingested into the system. The actual order has not been submitted to the media service team and this will not be done until content platform business has received the studio "long form" and has made the decision to move forward in processing.

1. Once the metadata file is received this will be fed into the content flow tracking tool. The business team of the business and partnerships module will make the decision to begin the ordering process. If there was an exception to the SD/HD Source flags where a source is missing and was expected to be delivered, the content Processing team will work to resolve with the studio partner. According to an exemplary embodiment, the following is submitted in the ordering process.
  Order template ID—media services will supply once workflow is completed.
  Content platform Order ID
  Provider ID
  Sub-Provider ID (sub-studio)
  Technicolor ID
  External ID—this is the provider's identification for title and may be used for royalty reporting, etc.
  MediAffinity Barcode
  SD Source Flag
  SD Source Confirmation Flag
  HD Source Flag HD Source Confirmation Flag
Priority Delivery Date 2. Once the above information is submitted, MediAffinity will begin processing the orders. In the MediAffinity workflow, updates will be sent every 24 hours, or in accordance with another pre-defined time period.

3. MediAffinity outputs video files and deploys them via Aspera or Aspera-like connection to Content platform's CDN partner.

4. MediAffinity delivers a metadata file that describes the various assets for one title into a "hot folder" with the following elements:
Title
Technicolor ID
Provider ID
Sub-Provider ID (sub-studio)
MediAffinity barcode
Asset filenames
Fulfilment URL
File size (bytes)
File checksum (from Aspera)
Container type (MP4, F4F, transport stream (TS), etc)—this will tell the streaming type
Encryption type (Flash Access, AES-128, Widevine, etc.)
Asset Resolutions
Asset Bitrates
Bit rate units
Scan type (Progressive, Interlaced)
Video frame rate
Definition type (HD, SD, etc.)
Variable Bit Rate (VBR)/Constant Bit Rate (CBR)
Audio format
Audio channels
Audio sampling 5. Another metadata file is delivered describing the mezzanine that was created through the SIFT workflow. This metadata is held strictly for information purposes in case reorders have to be made in the future.
Title
Technicolor ID
Provider ID
Sub-Provider ID (sub-studio)
MediAffinity barcode
Mezzanine Definition (HD, SD) and Resolution
Mezzanine Codec and Container Type
Mezzanine Bit-Rate
Mezzanine Audio Format, Channels and Sampling 6. Additionally, as files are encrypted in the MediAffinity flow encryption keys are delivered to the content platform's key management servers.

Ingest Workflow

According to exemplary embodiments, as metadata files are delivered from MediAffinity into a hot folder, the Content platform Ingest Workflow acts on the metadata with various rules based on the Provider ID.

Figure 2:
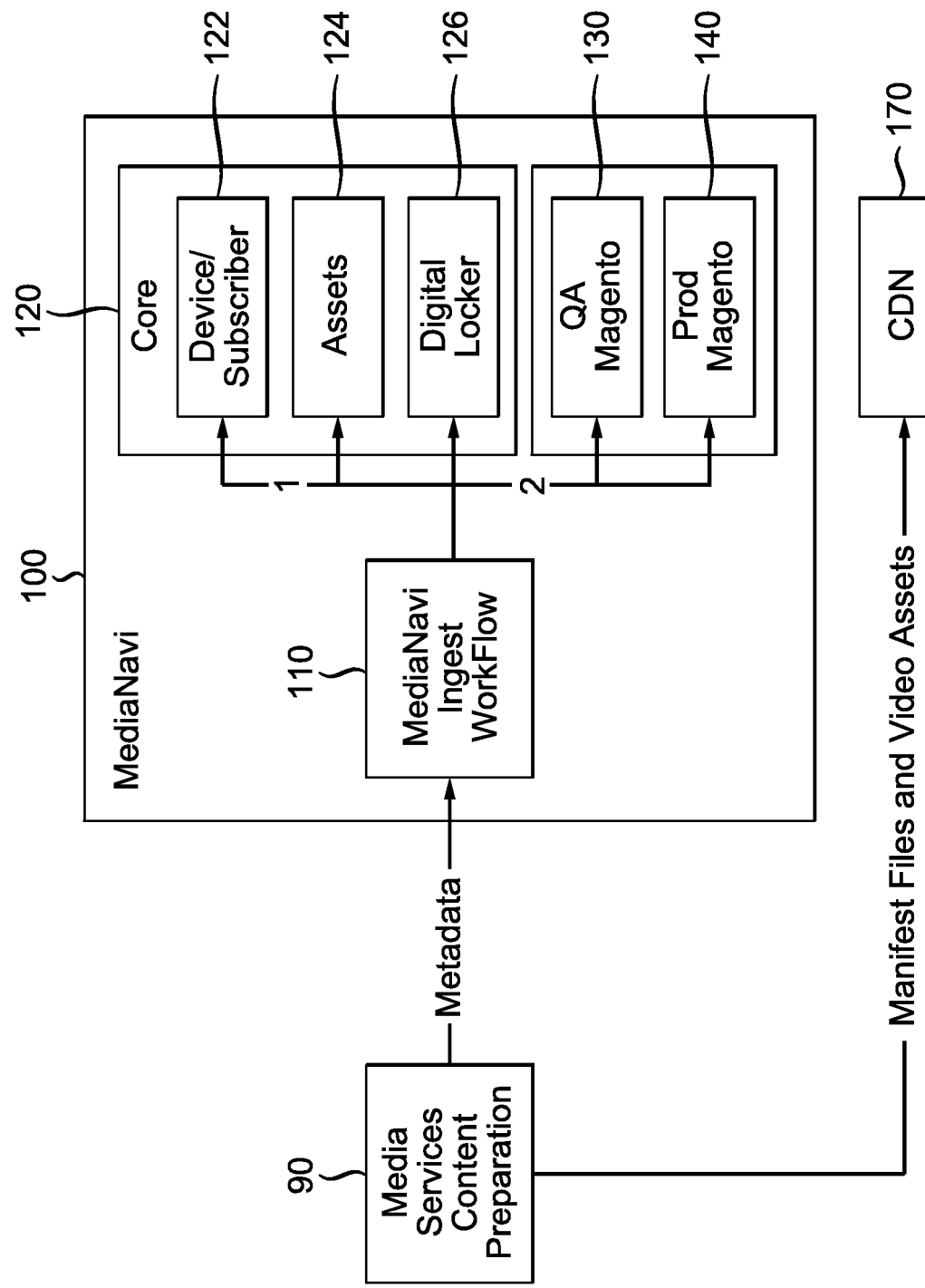
FIG. 2 shows a block diagram of a relevant portion of the content workflow of FIG. 1 according to exemplary embodiments of the present invention.

Referring now to FIG. 2, a block diagram of a relevant portion of the content workflow of FIG. 1 according to exemplary embodiments of the present invention is shown. Functional steps and/or interactions between the blocks in FIG. 2 will be described with specific reference to items 1-2 as shown in FIG. 2 and discussed below.

1. As metadata flows is delivered to a hot folder from MediAffinity (i.e., block 90), ingest workflow block 110 will begin generating new software elements in the system based on the Provider ID and pre-existing rules and policies. There is both a production core and QA core that receive these new elements.

a. Device/Subscriber block/module 122—Device/Subscriber block/module 122 is dependent on the Provider ID. This is where elements will be created for each asset to restrict distribution to numbers of devices, households or accounts.
Device restrictions for VOD playback—Limits the number of devices that can playback a VOD entitlement.
Device restriction for EST playback—Limits the number of devices that can playback an EST entitlement.
User and Device restrictions—Limits the number of devices that a user can bind to their account.
# of De-authorization/Authorizations of Authorized Device—Limits the number of devices that a user can bind and unbind to their account in a given period and has a time penalty if a user meets this restriction that lasts a certain amount of days before this limit resets.

b. Assets block 124—This area will house the location of assets on the CDN 170 as well as which device profiles they are bound to. After entitlement checking this is the module that will deliver the URL to the application.

c. Digital Locker block 126—All use entitlements are stored in the digital locker. The ingest workflow applies distribution policies in this location such as:
Geo-restrictions—by country and state/province (note that some content is restricted distributing even at the state/province level).
VOD Viewing Windows—Once a title is purchased a consumer will have only 30 days to initiate playback. If playback is not initiated within 30 days then the entitlement will be revoked in the digital locker.
VOD Playback Window—A period of time commencing from initiation of playback that allows the consumer to view the content as many times as they would like, pending distribution restrictions from the device/subscriber module.

2. Ingest workflow block 110 starts creating nearly identical offers to sell the content based on the rules and provides the same to both QA magento block 130 and production magento block 140. The only difference is that in the QA magento instance the offers will automatically be active for QA. The production magento offers will require a content processing person to update the offer to an active status.

Quality Assurance

Figure 3:
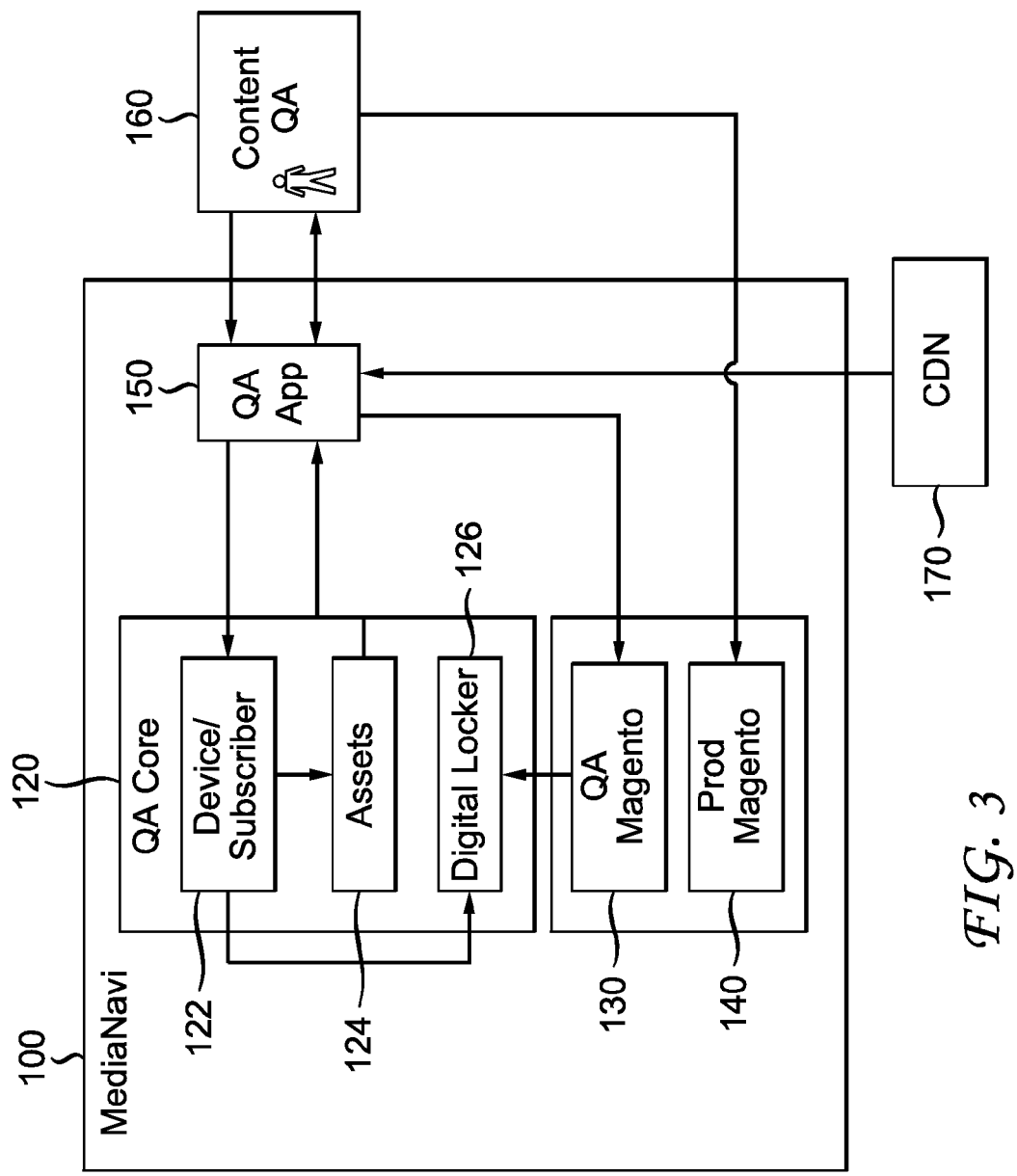
FIG. 3 shows another block diagram of a relevant portion of the content workflow of FIG. 1 according to exemplary embodiments of the present invention.

According to exemplary embodiments, quality assurance (QA) is a process of testing consumer-ready content (e.g., videos, etc.) on end-use devices to ensure that the quality is of an acceptable level. It is unrealistic to think that all video files will be tested against all devices as that would require an amount of resources and time as that could hinder or break the business model. Instead, the preferred method is to conduct testing on a subset of devices and video files. FIG. 3 shows a block diagram of a relevant portion of the content workflow of FIGS. 1 and 2 that is employed for the QA process according to exemplary embodiments of the present invention, where like reference numbers represent the same or similar blocks.

Content Ingest Tool

According to exemplary embodiments, the content ingest tool is a supply chain tracking system that allows the content ingest team and customer service to accomplish the following:

1. Facilitate the tracking of content in the system (sourced, processed, ingested, QA'd, published) as described in all steps above.

2. Parameters of existing rules and policies for providers can be updated and tracked.

3. Update and track order data flow (MediAffinity Barcode, Technicolor (TCH) ID, Provider ID and Title mapping).

4. Order placement and order status from MediAffinity.

5. Mass Rule/Policy updates for Providers—for example, UV added as an offer to provider catalogue.

6. Auditing—all updates/changes need to be tracked.

Content Preparation Tool

According to exemplary embodiments, the content ingest tool gives the user the ability to track content preparation starting from sourcing to the eventual delivery to CDN 170 of FIG. 1-3.

Views

The Content Ingest Tool shall include at least four (4) views:

1. List View
2. Detailed View
3. Rules View
4. Policies View

Search

According to exemplary embodiments, the Ingest Tool is user-friendly with the basic functionality to search by at least one or more of the following:

Title
Technicolor ID
Provider ID
Sub-Provider ID

Results

According to exemplary embodiments, depending on the search query different results will be displayed.

Detailed View:

Exact match of search against data in system (searched for Mission Impossible 3, data in system is Mission Impossible 3) (e.g., no caps detection)

Only match of search against data in system (searched for Break Up, only match in system is The Break Up)

List View:

According to exemplary embodiments, content in order to be ingested may have certain requirements placed on the attributes of such content including parameters such as:

> Video Codec
> Video Profile & Level
> Video Bit Rate (if applicable)
> Frame Rate
> Aspect Ratio
> Display Aspect Ratio
> Chroma
> Frame Size
> Subtitles
> Audio/Video Duration
> Audio Codec
> Audio Sample Rate
> Audio Bit Depth
> Audio Channels
> Target Loudness/db
> Peaks/db As described above, the present invention provides various methods and systems for providing a content workflow, including for example, various embodiments for ascribing metadata and processing media assets such as video, audio, and the like for ingestion into a media delivery platform.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating a system, comprising:
receiving, via said system, a plurality of media assets from a plurality of content providers, wherein said plurality of media assets having respective metadata files comprising respective provider identifications for identifying respective content providers of said plurality of media assets; and
generating for each content of ones of said plurality of media assets of a content provider, via said system and in response to said respective provider identifications, one or more software elements representing one or more rules for distributing said content; wherein said one or more rules restrict distribution of said content according to a number of devices that a user can bind to a user's account.

2. The method of claim 1, wherein said one or more rules are based on a negotiation between an entity associated with said system and an entity associated with said content.

3. The method of claim 1, further comprised of generating, via said system and in response to said metadata file, one or more software elements representing an offer to sell said content.

4. The method of claim 1, wherein said system receives said metadata file directly from a studio in a client/server environment.

5. A system, comprising:
means for receiving a plurality of media assets from a plurality of content providers, wherein said plurality of media assets having respective metadata files comprising respective provider identifications for identifying respective content providers of said plurality of media assets; and
means for generating for each content of ones of said plurality of media assets of a content provider, in response to said respective provider identifications, one or more software elements representing one or more rules for distributing said content; wherein said one or more rules restrict distribution of said content according to a number of devices that a user can bind to a user's account.

6. The system of claim 5, wherein said one or more rules are based on a negotiation between an entity associated with said system and an entity associated with said content.

7. The system of claim 5, further comprising means for generating, in response to said metadata file, one or more software elements representing an offer to sell said content.

8. The system of claim 5, wherein said system receives said metadata file directly from a studio in a client/server environment.

9. A system, comprising:
an input operative to receive a plurality of media assets from a plurality of content providers, wherein said plurality of media assets having respective metadata files comprising respective provider identifications for identifying respective content providers of said plurality of media assets; and
a processor operative to generate for each content of ones of said plurality of media assets of a content provider, in response to said respective provider identifications, one or more software elements representing one or more rules for distributing said content; wherein said one or more rules restrict distribution of said content according to a number of devices that a user can bind to a user's account.

10. The system of claim 9, wherein said one or more rules are based on a negotiation between an entity associated with said system and an entity associated with said content.

11. The system of claim 9, wherein said processor is further operative to generate, in response to said metadata file, one or more software elements representing an offer to sell said content.

12. The system of claim 9, wherein said system receives said metadata file directly from a studio in a client/server environment.

* * * * *